United States Patent
Yakar Elbeyli et al.

(10) Patent No.: US 11,760,648 B2
(45) Date of Patent: Sep. 19, 2023

(54) PURIFICATION OF BORIC ACID WITH ION EXCHANGE PROCESS

(71) Applicant: TUBITAK, Ankara (TR)

(72) Inventors: Iffet Yakar Elbeyli, Kocaeli (TR); Ahmet Baykan, Istanbul (TR); Abdullah Zahid Turan, Kocaeli (TR); Ismail Ersan Kalafatoglu, Istanbul (TR); Murat Bilen, Ankara (TR); Erhan Tektas, Ankara (TR); Fazli Cabbar Metin, Ankara (TR)

(73) Assignee: TUBITAK, Ankara (TR)

( * ) Notice: Subject to any disclaimer, the term of this patent is extended or adjusted under 35 U.S.C. 154(b) by 641 days.

(21) Appl. No.: 16/979,196

(22) PCT Filed: Mar. 14, 2019

(86) PCT No.: PCT/IB2019/052075
§ 371 (c)(1),
(2) Date: Sep. 9, 2020

(87) PCT Pub. No.: WO2019/175825
PCT Pub. Date: Sep. 19, 2019

(65) Prior Publication Data
US 2020/0407233 A1 Dec. 31, 2020

(30) Foreign Application Priority Data
Mar. 14, 2018 (TR) .................... 2018/03636

(51) Int. Cl.
| | | |
|---|---|---|
| *C01B 35/10* | (2006.01) | |
| *B01D 9/00* | (2006.01) | |
| *B01D 15/36* | (2006.01) | |
| *B01D 21/26* | (2006.01) | |

(52) U.S. Cl.
CPC .......... *C01B 35/109* (2013.01); *B01D 9/0004* (2013.01); *B01D 9/0059* (2013.01); *B01D 15/362* (2013.01); *B01D 15/363* (2013.01); *B01D 21/262* (2013.01); *B01D 21/267* (2013.01); *B01D 2009/0086* (2013.01); *C01P 2006/80* (2013.01)

(58) Field of Classification Search
CPC .. C01B 35/109; B01D 9/0004; B01D 9/0059; B01D 15/362; B01D 15/363; B01D 21/262; B01D 21/267; B01D 2009/0086; C01P 2006/80
See application file for complete search history.

(56) References Cited

U.S. PATENT DOCUMENTS

| | | |
|---|---|---|
| 3,103,412 A | 9/1963 | Dwyer |
| 5,084,260 A | 1/1992 | Bertocci et al. |

FOREIGN PATENT DOCUMENTS

| | | | |
|---|---|---|---|
| CN | 101412519 A | 4/2009 | |
| CN | 104386704 A | 3/2015 | |
| CN | 104743564 A | 7/2015 | |
| CN | 105347353 B | 10/2017 | |
| FR | 2 601 939 A1 * | 1/1988 | ........... C01B 35/109 |

OTHER PUBLICATIONS

Ozkan Aydin et al., A semiempirical kinetic model for removal of iron (Fe3+) from saturated boric acid solution by ion exchange using amberlite IR-120 resin, Particulate Science and Technology, An International Journal, 2017, pp. 505-511, vol. 35, No. 5.

* cited by examiner

*Primary Examiner* — Timothy C Vanoy
(74) *Attorney, Agent, or Firm* — BAYRAMOGLU LAW OFFICES, LLC

(57) ABSTRACT

The present invention relates to the process of purification of boric acid by ion exchange method. Boric acid is dissolved in hot demineralized water. The hot solution is pressure-filtered. The hot saturated solution, which is purified from water-insoluble, is passed through a column containing strong cation exchange resin, followed by a column containing weak anion exchange resin at the same temperature and cooled afterwards. The crystals settling by cooling are separated from the mother liquor, the amount of aqueous solution within them is reduced and then dried. The waste solution formed during crystallization and filtrate formed after separation of crystals from aqueous solution are mixed and used in boric acid dissolving process. The developed method enables the reduction of sodium, sulfate, chloride and iron impurities of technical grade boric acid to less than 1 ppm and is more economic and environmental friendly than current methods.

15 Claims, 1 Drawing Sheet

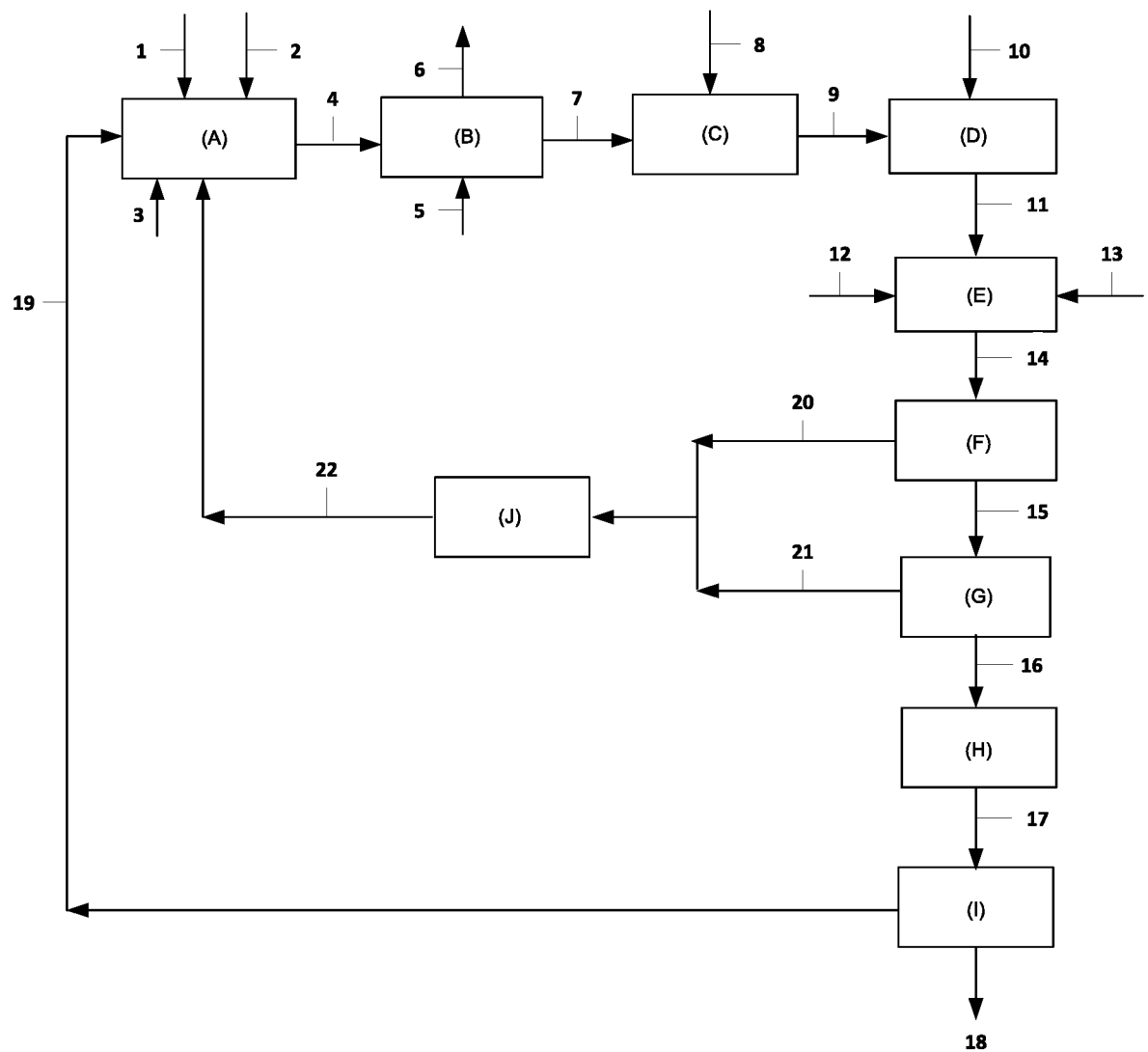

PURIFICATION OF BORIC ACID WITH ION EXCHANGE PROCESS

CROSS REFERENCE TO THE RELATED APPLICATIONS

This application is the national phase entry of International Application No. PCT/IB2019/052075, filed on Mar. 14, 2019, which is based upon and claims priority to Turkish Patent Application No. 2018/03636, filed on Mar. 14, 2018, the entire contents of which are incorporated herein by reference.

TECHNICAL FIELD

The present invention relates to a process for purification of boric acid by ion exchange method. The method relates to the technical field of inorganic chemistry and describes all steps of the process of removing inorganic impurities in boric acid by ion exchange resins.

BACKGROUND

In U.S. Pat. No. 5,084,260, technical grade boric acid, which has a purity of 99%, is dissolved in water and purified to 99.99% by a single-stage recrystallization process. In the first stage, technical grade boric acid is dissolved in water. A saturated solution containing 18% to 22% by weight boric acid is prepared at a temperature range of 88° C. to 92° C. Following filtration, saturated solutions are crystallized by cooling to a temperature of 40° C. under vacuum. After the solution is discarded via a thickener, the wet crystals are separated by centrifugation and dried. Following the separation of crystals, the 8% boric acid and impurity containing mother liquor is purified by passing through strong cation exchange resin (Amberlite IR-120; Duolite C-25; Dowex 50 of the Lewatit S100) column and weak anion exchange resin (Amberlite IR-4B, Amberlite IR-45, Amberlite IRA 94 S Duolite A-7, Duolite A-14, Dowex-3) column, respectively, and cycled back to dissolution step afterwards.

In Pat. No. CN104743564, industrial boric acid is used as raw material. The saturated solution prepared at a temperature of 30°, is subjected to a strong cation exchange resin followed by a strong anion exchange resin, respectively, and crystallized by cooling to 20° C. After evaporation process, the crystals are separated from the solution by cooling crystallization. The separated crystals are vacuum filtered, washed and dried at 50° C.

In Pat. No. CN101412519, high purity boric acid is prepared by ion exchange and recrystallization. Boric acid solution between temperature range of 50° C.-60° C. is passed through a column containing strong acidic cation exchange resin and the metal ions are removed and the boric acid is crystallized by cooling the solution to room temperature. The number of columns is more than 2.

In Pat. No. CN104386704, a not fully saturated solution of technical grade boric acid is prepared by heating to a temperature of 50-60° C. The hot solution is quartz sand filtered and then passed through an acid-based mixed bed ion exchanger column at a flow rate of 8~10 mL/min. After the ion exchange process, the solution is heated to 40~55° C., filtered through a microporous membrane, cooled, centrifuged and finally boric acid is obtained. On the other hand, a secondary pure boric acid is obtained by washing the crystal through a vacuum filter and drying.

The Pat. No. CN105347353 provides a method of preparing high purity boric acid. Industrial boric acid with 95% or higher purity is added in the main solution containing inorganic acid and alcohol and dissolved in the temperature range of 80-95° C. for 1 to 2 hours. It is cooled and centrifuged to obtain wet boric acid crystals. The mother liquor is purified by passing through a cation exchange resin column and an anion exchange resin column, respectively, and the purified solution is used in the crystal washing process.

Boric acid is an inorganic boron chemical used in glass, glass fiber, ceramics, detergents, impregnation and protection chemicals, pharmaceuticals, cosmetics, pesticides, electrolytic capacitors, as well as in agriculture and nuclear power plants. Sulfate, heavy metal, alkali oxide, iron, chloride, arsenic and other water-insoluble compounds in boric acid are undesirable major impurities. The type and amount of impurity content determines the market value and the industrial area where boric acid will be used. As the amount of impurity increases, the economic value of boric acid decreases. The type and amount of impurity may vary depending on the boron mineral (tincal, colemanite, kernite, ulexite) used in its production, the inorganic acid used, the purification method and the efficiency of the equipment used in the purification process. The initial impurity in technical grade boric acid is the factor which determines the entire purification process.

In purifying technical grade boric acid, recrystallization and adsorption onto ion exchange resin methods have been developed (U.S. Pat. No. 5,084,260, CN104743564, CN101412519, CN104386704, CN105347353).

In U.S. Pat. No. 5,084,260, the saturated boric acid solution prepared at a temperature of 90° C. is cooled to 40° C., the crystals that are separated via a thickener are centrifuged and dried. The 8% main solution formed during crystallization is passed through ion exchange resins and the impurities are removed from the solution, which is fed back to dissolution afterwards. The type and amount of impurities vary depending on the boron mineral (tincal, colemanite, kernite, ulexite etc.) used in boric acid production, the inorganic acid used, the purification method and the efficiency of the equipment used in the purification process. While the amount of initial impurities is the factor that determines the entire purification process, the sulfate content of the product can be high and variable. Since the technical grade boric acid used in the method developed in the U.S. Pat. No. 5,084,260 is not specified, the type and the amount of initial impurities optimized are unclear. Impurity removal steps include: the preparation of a solution having 18% to 22% boric acid, crystallization, centrifugation, the purification of the weak mother liquor containing 8% boric acid obtained from the crystallization process by passing through ion exchange resins and feeding the purified solution back to the dissolution process. In the developed method, saturated boric acid solution is prepared at lower temperatures (60-70° C.) and lower boric acid concentrations (12%-14%). The advantage of the developed method is that sulfate, iron, chloride and sodium content can be reduced to <1 ppm. sulfate. In the U.S. Pat. No. 5,084,260, it was found that the total amount of impurities in the pure boric acid obtained was less than 100 ppm, while the amount of sulfate, iron, chloride and sodium impurities were not specified. In the boric acid products preferred for the LCD sector and for the nuclear field as well, it is particularly desired that the sulfate impurities be below 1 ppm for the prevention of bubble formation in the produced glasses.

In Pat. No. CN104743564, the saturated boric acid solution prepared at 30° C. was passed through ion exchange resin columns and the crystals obtained after cooling to 20°

C. were subjected to washing. The low solubility difference suggests that the rate of boric acid production will be low. The use of strong anion exchange resin causes the ion-exchange of boron ions in the feed solution and so the decrease of boron concentration in the feed solution, which will reduce the process efficiency. It is also stated that crystal washing is performed at the end of the process. This leads to a loss of boric acid.

The technical problem in Pat. No. CN101412519 is that 99.9999% purity is guaranteed without anion removal from boric acid. In boric acid, anionic compounds such as sulfates and chlorides, are the major impurities along with cations and must be removed in order to reach high purity. The type and amount of impurities in boric acid, which were dissolved at the beginning of the process and purified, were not explained.

In Pat. No. CN104386704, it was reported that high purity boric acid was obtained using 10-12% boric acid solution, yet the type and amount of impurities present in the purified boric acid and the product purity as well, are not mentioned. Continuous use of water is required since it is not stated whether the mother solution is cycled back to re-dissolving following crystallization or not. This increases the cost of the process.

The technical problem in Pat. No. CN105347353 is that the inorganic acids added to the solution during dissolution cause the deposition of chloride, sulfate, fluoride and nitrate impurities in boric acid. Likewise, the alcohols used in dissolving lead to the increase of organic contaminants in boric acid. When the results of the analysis are evaluated, it is seen that the purity of the boric acid with a minimum of 95% purity is increased to 99.99% and the amount of anionic impurities is uncertain.

SUMMARY

With the developed method, the main impurities namely sulfate, chloride, iron and sodium present in technical grade boric acid having 300 ppm max. sulfate and 99.96% purity i.e. are reduced to less than 1 ppm. The advantage of this method is the use of a weak anion exchange resin and that is does not need crystal washing. In addition, the present method allows the production of about 2 times more boric acid per unit time compared to the Pat. No. CN104743564. Another advantage of the developed method is that waste solutions formed in the process are re-used in dissolution process without being discharged to the environment and so boron (raw material) loss in solution is prevented.

BRIEF DESCRIPTION OF THE DRAWINGS

The flow diagram of the purification process designed to achieve the object of the present invention is shown in the appended form.

FIGURE. Boric acid purification process by ion exchange process.

EXPLANATION OF REFERENCES IN FIGURE

A. Boric acid dissolving step
  1. Boric acid
  2. Demineralized water
  3. Heating (A)
  4. Hot saturated solution
B. Pressure-filtering step
  5. Pressure
  6. Insoluble impurities
  7. Hot filtrate solution
C. Passing through strong cation exchange resin column step
  8. Heating (C)
  9. Cation-impurity-reduced solution
D. Passing through weak anion exchange resin column step
  10. Heating (D)
  11. Impurity-removed solution
E. Crystallizing precipitation step
  12. Vacuum
  13. Cooling
  14. Impurity-removed crystalline solution
F. Separation of the settled wet crystals from waste solution step
  15. Settled wet crystals
  20. Waste solution
G. Separation of crystals from aqueous solution step
  16. Wet crystals
  21. Filtrate
H. Wet crystals drying step
  17. Dried crystals
I. Sieving of dried crystals step
  18. Boric acid with a minimum of 99.99% purity, whose main impurities are reduced below 1 ppm.
  19. Coarse crystal grains from the sieve
J. Combining filtrate with waste solution step
  22. Combined stream

DETAILED DESCRIPTION OF THE EMBODIMENTS

The process flow diagram created by the developed method is given in FIGURE.

Boric acid (1) with a minimum of 99.96% purity, containing 300 ppm max. sulfate, 5 ppm chloride, 4 ppm iron, is dissolved in demineralized water (2) by heating (3) and mixing (A). In boric acid dissolving step, heating and mixing can be performed in a jacketed and agitated reactor having demineralized water. Hot saturated solution (4) is filtered (B) by using pressure (5). Micron porous membrane filters can be used for filtration. The hot filtrate (7), which is purified from not-fully-water-soluble impurities (6), is passed through a heated (8) column containing strong cation exchange resin (C). The cation-impurity-reduced solution (9) is passed through a heated (10) column containing weak anion exchange resin (D). In passing through strong cation exchange resin column (C) and passing through weak anion exchange resin column (D) steps, the solution can be purified by passing through jacketed columns. The impurity-removed solution (11) is cooled (13) and boric acid is precipitated by crystallization (E). The settled wet crystals (15) in the impurity-removed crystalline solution (14) are separated (F) from the waste solution (20). In the step of separation of settled wet crystals from waste solution, impurity-removed crystalline solution can be fed to a hydrocyclone to separate settled wet crystals. Settled wet crystals (15) are subjected to crystal-solution separation process (G) in order to reduce solution amount. The centrifugation technique can be used to remove crystals from solution. The obtained wet crystals (16) are dried (H) and the dried crystals (17) are sieved (I). Airflow can be utilized for drying during wet crystal drying step. Boric acid (18) with a minimum 99.99% purity, whose main impurity levels are reduced below 1 ppm, is obtained. The coarse crystals grains (19) coming out of the sieve are fed back to the first stage of the process namely boric acid dissolving step (A). The waste solution (20) formed during the separation of settled wet crystals from waste solution step and the filtrate (21) that formed during separation of crystals from aqueous solution step are combined (J). This combined stream (22) is fed back to the first stage of the process, the boric acid dissolving step (A).

With the method developed, technical grade boric acid of 99.96% purity, which is preferably produced from colemanite mineral and which contains 300 ppm max. sulfate, 5 ppm chloride and 4 ppm iron; can be purified to a such degree where it contains less than 1 ppm of sulfate, iron, chloride and sodium. In the mentioned method, the step of dissolving boric acid in water is carried out at a temperature in the range of 60 to 70° C., and the acidic solution formed after dissolution contains boric acid between 12-14% by weight. The resulting hot saturated solution is filtered at a pressure range of 3 to 5 bar. The filtered solution is passed through respectively the column containing cation exchange resin which is maintained at a temperature of 60-70° C., with a flow rate of 20-25 BV/h and column containing a weak anion exchanging resin maintained at a temperature of 60-70° C. with a flow rate in the range 20-25 BV/h. The purified solution is cooled by cooling crystallization under vacuum at temperature range of 35 to 40° C. and the boric acid is settled by crystallization. The wet crystals are separated from the aqueous solution and dried at a temperature between 45° C. and 55° C. After sieving the dried crystals, boric acid with a purity of 99.99% min. containing less than (<) 1 ppm content of sulfate, sodium, chloride and iron, is obtained. During the process, the waste solution formed after crystallizing precipitation step and the filtrate solutions formed during separation of crystals from aqueous solution step are mixed and fed back to the first stage of the process that is boric acid dissolving step.

Example: 1750 g demineralized water is transferred to a jacketed and agitated reactor and heated to 60° C. 250 g of boric acid having 99.96% purity, whose impurity content is given in Table 1, is weighed and added to the reactor and mixed for 1-2 hours. The solution, which is at 60° C. and contains 12.5% by weight boric acid is filtered at 3 bar pressure through a membrane having 1 micron and less pores. The hot filtrate solution, which is purified from water-insoluble impurities, is passed through a jacketed column containing strong cation exchange resin and jacketed column containing weak anion-exchanging resin, respectively, at 60-70° C. and at a flow rate of 25 BV/h. The solution, whose impurities are removed via purification is cooled to 35-40° C. by applying vacuum. Wet crystals that are crystallized and settled with effect of cooling, are removed from waste solution. The amount of waste solution in the wet crystals is reduced by centrifugation, which is applied for the separation of the settled wet crystals from the waste solution. The wet crystals are dried and sieved by airflow at a temperature range of 45-55° C. The waste solution coming from crystallization and the filtrate coming from the separation of settled wet crystals from waste solution step are mixed and fed back to boric acid dissolving step. After the process a high purity boric acid containing less than 1 ppm content of sulfate, sodium, chloride and iron impurities, is obtained. Anion-cation resin pairs used in the experimental study; Purolite Puropack PPC 100H-Purolite A100, Relite CF-Relite A100 and Amberlite IR120Na-Dowex Marathon WBA Amberlite. The results of the analysis of the products obtained are given in Table 2.

TABLE 1

Impurity values of technical grade boric acid

| Impurity type | Content (ppm) |
|---|---|
| Na | 10.81 |
| Mg | 28 |
| Ca | 21 |
| K | <2.5 |
| Li | <0.2 |
| $SO_4$ | 229 |
| Cl | 1.80 |
| Fe | 2.34 |
| Non-soluble | 27 |

TABLE 2

Impurity values of high purity boric acid products obtained in experimental studies (ppm)

| Impurity type | Purolite 100H - Purolite A100 | Relite CF- ReliteA100 | Amberlite IR120Na- Marathon Dowex |
|---|---|---|---|
| Na | 0.45 | 0.49 | 0.45 |
| Mg | <0.58 | <0.61 | <0.56 |
| Ca | <1.92 | <1.68 | 2.80 |
| K | <1.16 | <1.22 | <1.13 |
| Li | <0.1 | <0.1 | <0.1 |
| $SO_4$ | 0.35 | 0.37 | 0.34 |
| Cl | 0.07 | 0.07 | 0.07 |
| Fe | 0.30 | 0.43 | 0.45 |

The Way of Application of the Invention to the Industry

The boric acid purified by the method developed in the context of the present invention can be used in the production of TFT-LCD panel glasses and in nuclear power plants. The reason for the use of boric acid in the production of TFT-LCD panels is that it forms resistance to thermal and mechanical impact by forming a network within the glass structure, thereby creating resistance to scratching and chemical wear. In addition to increasing the transparency and optical properties of the glass, it also reduces the melting temperature and thereby reduces production costs. Boric acid is used in nuclear plants due to being a water-soluble and chemically stable neutron absorber. It is included in the main cooling lines for the control of nuclear fusion speed in pressurized water reactors (PWR). It allows the reactor operator to get control values in the reactor for a longer time. It helps to minimize corrosion and damage to the parts in contact with cooling water.

What is claimed is:

1. A boric acid purification process by ion exchange method comprising the following steps:
   (A) dissolving a boric acid in demineralized water at a temperature in a range of 60 to 70° C.;
   (B) pressure-filtering;
   (C) passing through a strong cation exchange resin column;
   (D) passing through a weak anion exchange resin column;
   (E) crystallizing a precipitation;
   (F) separating settled wet crystals from a waste solution;
   (G) separating crystals from the settled wet crystals and an aqueous solution;
   (H) drying the crystals;
   (I) sieving the crystals dried in step (H) and feeding coarse crystal grains obtained in step (I) back to step (A);
   (J) combining the waste solution and a filtrate from step (G) into a combined stream and feeding the combined stream back to step (A).

2. The boric acid purification process by ion exchange method according to claim 1, wherein the boric acid used in step (A) is dissolved by heating and mixing using a jacketed and agitated reactor.

3. The boric acid purification process by ion exchange method according to claim 1, wherein the boric acid used in step (A) is at a minimum 99.96% purity and contains a maximum of 300 ppm sulfate, 5 ppm chloride and 4 ppm iron.

4. The boric acid purification process by ion exchange method according to claim 1, wherein the boric acid used in step (A) is a saturated boric acid solution and prepared at a concentration in a range of 12% to 14% by weight.

5. The boric acid purification process by ion exchange method according to claim 1, wherein step (B) is carried out under a pressure in a range of 3 to 5 bar.

6. The boric acid purification process by ion exchange method according to claim 1, wherein step (B) is performed using a membrane filter of less than 1 micron pore size.

7. The boric acid purification process by ion exchange method according to claim 1, wherein in step (C) and step (D), a temperature of the strong cation exchange resin column and the weak anion exchange resin column is maintained at a range of 60° C. to 70° C.

8. The boric acid purification process by ion exchange method according to claim 1, wherein a boric acid solution saturated with the boric acid is used in step (C) and step (D), and the boric acid solution is passed through the strong cation exchange resin column and the weak anion exchange resin column at a flow rate of 20-25 $m^3/m^3 \cdot h$ (BV/h).

9. The boric acid purification process by ion exchange method according to claim 1, wherein in step (C), a jacketed column containing a strong cation exchange resin is used as the strong cation exchange resin column, and in step (D), a jacketed column containing a weak anion exchange resin is used as the weak anion exchange resin column.

10. The boric acid purification process by ion exchange method according to claim 1, wherein step (E) is carried out at a temperature range of 35-40° C.

11. The boric acid purification process by ion exchange method according to claim 1, wherein step (F) is carried out using a hydrocyclone.

12. The boric acid purification process by ion exchange method according to claim 1, wherein in step (G), centrifuge is used for separating the crystals from the aqueous solution.

13. The boric acid purification process by ion exchange method according to claim 1, wherein step (H) is carried out by means of air flow.

14. The boric acid purification process by ion exchange method according to claim 1, wherein step (H) is carried out in a temperature range of 45-55° C.

15. The boric acid purification process by ion exchange method according to claim 1, wherein the boric acid is obtained from colemanite, tinkal, kernite and ulexite minerals, and the boric acid is an industrial grade boric acid with minimum 99.96% purity, containing maximum 300 ppm sulfate, 5 ppm chloride and 4 ppm iron content.

* * * * *